May 31, 1960 C. MANTELL, JR 2,938,732

DISC RECORD CLEANING DEVICE

Filed Aug. 13, 1958 2 Sheets-Sheet 1

INVENTOR.
CORNELIUS MANTELL JR.

INVENTOR.
CORNELIUS MANTELL JR.

2,938,732

DISC RECORD CLEANING DEVICE

Cornelius Mantell, Jr., R.F.D. 3, East Hampton, Conn.

Filed Aug. 13, 1958, Ser. No. 754,862

5 Claims. (Cl. 274—47)

This invention relates to record playing equipment and more particularly to a device for cleaning disc type records.

It is an object of the present invention to provide apparatus for safely and effectively cleaning the playing surfaces of disc type records in a convenient and efficient manner.

Another object of the present invention is to provide handling equipment for cleaning disc type records without damaging the labels thereof and without causing the record to warp.

Still a further object of the present invention is to provide record cleaning apparatus of the above type that simultaneously grounds the record during the cleaning thereof and which includes a convenient support for allowing the record to dry before being used.

Other objects of the invention are to provide a disc record cleaning device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figures 1, 2, 3:
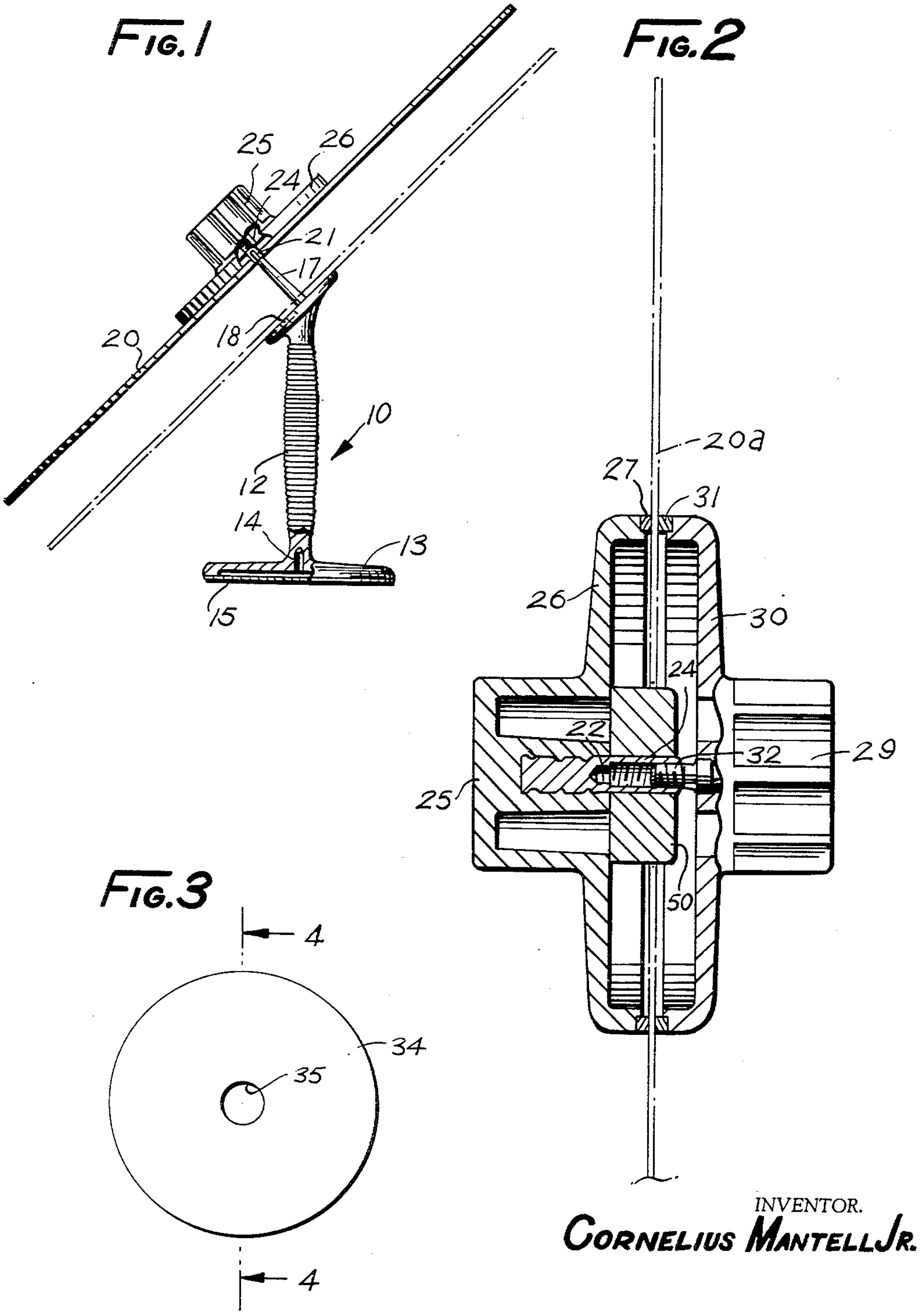
Figure 1 is a side elevational view, with parts broken away, of a support forming a part of the record cleaning apparatus made in accordance with the present invention, in operative use.
Figure 2 is an end elevational view, wtih parts broken away, of a pair of handles forming a part of the record handling apparatus.
Figure 3 is a side elevational view of a sponge cleaning element forming another part of the present invention.
Figures 4, 5:
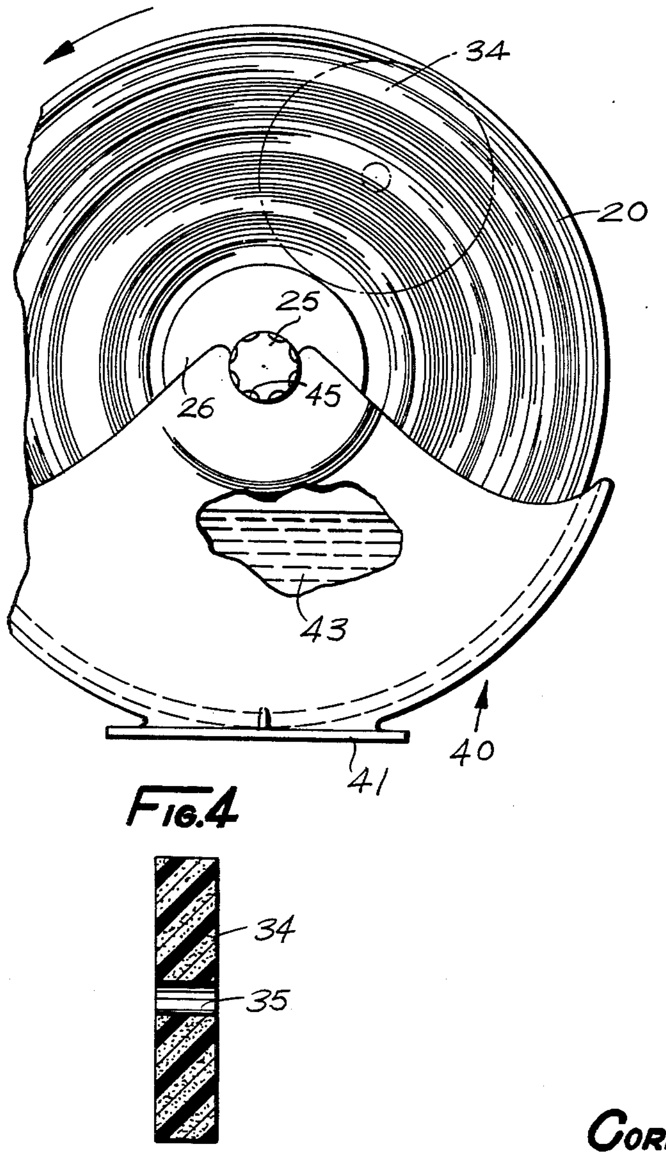
Figure 4 is a cross sectional view taken along line 4—4 of Figure 3.
Figure 5 is a side elevational view, with parts broken away, of a cleaning tank forming still another part of the present invention, in operative use.
Figure 6:
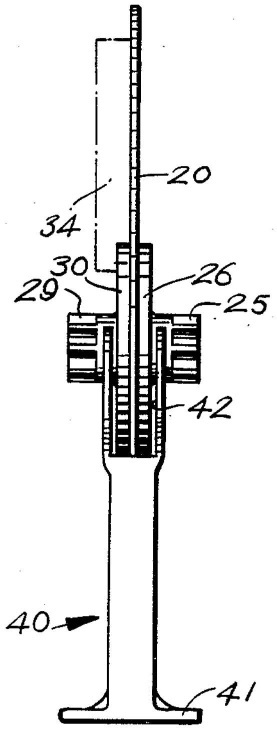
Figure 6 is an end elevational view of the apparatus shown in Figure 5.

Referring now more in detail to the drawing, disc record cleaning apparatus made in accordance with the present invention is shown to include a stand 10 having a hand grip 12 and a circular base 13 which has a centrally located shallow bore 14 therein. A pad 15, of any soft material, enables the stand to be secured, by means of the hole 14, to any desired stationary object, such as the cabinet of a record player. The upper end of the hand grip 12 has an inclined surface 18 which defines an acute angle with the plane of the base 18. A central spindle 17 extending perpendicularly outwardly from the inclined surface 18 slidably receives the center of a disc type record 20 that is to be placed upon the stand to dry. In order to properly position the record 20 with respect to the longitudinal axis of the spindle 17, the outer end of the spindle 17 is provided with a nipple 21 that is releasably received within a socket 22 of an internally threaded sleeve 24 which forms a part of a handle 25.

As is more clearly shown in Figure 2 of the drawing, the handle 25 is concentric with a circular plate 26 having a water tight gasket 27 extending around the periphery thereof. This handle 25 cooperates with another similar handle 29 which also includes a circular plate 30 and annular gasket 31 for sealing the label portion of the record against the entrance of moisture during the cleaning operation. This handle member 29 has a concentric stud 32 which is threadedly received within the internally threaded sleeve 24 of the first handle 25. Thus, with the handles 25, 29 in assembled engagement with each other, the annular gaskets 27, 31 effectively seal off the central area of the record during the cleaning operation. In the case of 45 r.p.m. records 20*a*, an adapter 50 is slidably placed upon the outside of the sleeve 24 for positioning within the enlarged central opening of this type of disc record. However, in the case of other types of records, the sleeve 24 is slidably placed within the spindle receiving opening that is normally provided.

A cleaning sponge 34 in the form of a circular member is provided with a central opening 35. This sponge is preferably constructed of sponge rubber, plastic foam, or the like, is extremely soft, and efficiently removes excess water from the record, leaving the record slightly damp thereafter.

A cleaning tank 40 is also provided and includes a pair of narrowly spaced apart side walls that define a central cleaning compartment 42 supported upon a base 41. This compartment 42 is cleaned with a cleaning fluid 43 of any desired type, such as water, while the upper edges of each side define an upwardly opening socket bearing 45 for rotatably receiving the handles 25, 29 of the handling unit therewithin. Thus, by rotating the disc 20 and the connected handles 25, 29 within the fluid 43, the surface of the record is easily and efficiently cleaned without wetting or otherwise damaging the label portion of the record. When the record is removed from the tank 40, the sponge 34 is used to remove the excess liquid from the faces thereof and one handle 29 is removed. The sleeve 24 is then placed over the outer end of the spindle 17 of the stand 10 so that the nipple 21 may be concentrically received within the socket 22. Thus, with the face of the record parallel to the inclined surface 18 of the stand and concentric with the longitudinal axis of the spindle 17, the record 20 will readily disengage the sleeve 24 and slide downwardly upon the spindle 17 in the manner shown in Figure 1. The record may thus be supported in this position until it is more thoroughly dried and ready to play.

It will now be recognized that the cleaning fluid 43 tends to ground any static charge upon the playing face of the record. Furthermore, the sponge 34 allows the record to remain damp so that when it is played in this damp condition static is minimized to improve the playing qualities of the record. In no case, is it necessary to handle the record other than by means of the prescribed equipment, so that the playing surfaces of the record are carefully preserved.

While various changes may be made in the detail construction, it shall be understood that such changes shall be within the spirit and scope of the present invention as defined by the appended claims.

What I claim as new and desire to protect by Letters Patent of the United States is:

1. A disc type record cleaning device comprising, in combination, a revolubly mounted record support fixture embodying a pair of circular plates with inner and outer walls and having an annular liquid tight gasket means extending around the periphery of each of the inner walls thereof, and each of said plates having a hub portion extending outwardly from the center portion of the outer walls thereof, movable means to secure said plates in assembled juxtaposition with space therebetween the inner walls thereof to receive a disc type record therebetween for gasket abutting surface engagement with a side of the record, and means for supporting said plates vertically embodying an open top receptacle in the lower portion thereof suitable to retain washing liquids and located beneath the lower edge of said plates.

2. The combination according to claim 1, wherein said hub portions form a pair of handles, one handle embodying an internally threaded sleeve and the second handle embodying a concentric stud threaded at one end which is threadedly received in said sleeve to form said means to secure said plates in assembled position.

3. The combination according to claim 2, wherein said open top receptacle includes a pair of narrowly spaced apart side walls that define a central cleaning compartment supported upon a base, the upper free edges of each side wall having open socket bearings for removably receiving the handles and rotatably supporting same therein; whereby disc type records may be clamped between the plates and cleaned by rotating the records in the washing liquid in said cleaning compartment.

4. The combination according to claim 2, wherein said internally threaded sleeve has a socket therein, said socket adapted to receive a nipple upon the free end of a spindle when the plate with said sleeve is removed from said plate supporting means, said spindle extending perpendicularly outwardly from the upper surface of an inclined plate rigidly secured upon the upper end of a support mounted upon a base; whereby damp records may be supported upon said spindle to dry and be held thereon by said plate with said sleeve.

5. The combination according to claim 1, wherein said receptacle comprises a pair of side walls defining a substantially narrow semi-circular compartment, and said bearing means comprises an upwardly opening socket defined by the upper edge of each of said side walls.

References Cited in the file of this patent

UNITED STATES PATENTS

| | | |
|---|---|---|
| 1,128,981 | Hoffman | Feb. 16, 1915 |
| 1,807,073 | Schultz | May 26, 1931 |
| 2,272,157 | Spinner | Mar. 11, 1940 |
| 2,501,465 | Caramanoff | Mar. 21, 1950 |